(12) United States Patent
Crawford et al.

(10) Patent No.: US 9,120,021 B2
(45) Date of Patent: Sep. 1, 2015

(54) INTERACTIVE LEAN SENSOR FOR CONTROLLING A VEHICLE MOTION SYSTEM AND NAVIGATING VIRTUAL ENVIRONMENTS

(71) Applicant: DISNEY ENTERPRISES, INC., Burbank, CA (US)

(72) Inventors: David W. Crawford, Long Beach, CA (US); Isaac D. Talamantes, Costa Mesa, CA (US); Tyler Emptage, Burbank, CA (US); Jonathan Ackley, Glendale, CA (US); Bei Yang, Los Angeles, CA (US); Hao Wang, Los Angeles, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 220 days.

(21) Appl. No.: 13/860,170

(22) Filed: Apr. 10, 2013

(65) Prior Publication Data
US 2014/0309035 A1   Oct. 16, 2014

(51) Int. Cl.
| A63F 13/20  | (2014.01) |
| A63F 13/245 | (2014.01) |
| A63F 13/803 | (2014.01) |
| A63F 13/285 | (2014.01) |

(52) U.S. Cl.
CPC ............. *A63F 13/245* (2014.09); *A63F 13/285* (2014.09); *A63F 13/803* (2014.09)

(58) Field of Classification Search
CPC .................. A63F 13/285; A63F 13/28; A63F 2300/1037; A63F 2300/302; G07F 17/3206
See application file for complete search history.

(56) References Cited

U.S. PATENT DOCUMENTS

| 4,049,262 | A |   | 9/1977  | Cunningham, Jr. |
| 5,209,662 | A |   | 5/1993  | Fujita et al. |
| 5,415,550 | A |   | 5/1995  | Aoki et al. |
| 5,605,462 | A | * | 2/1997  | Denne .............................. 434/55 |
| 5,662,523 | A |   | 9/1997  | Yasumaru et al. |
| 5,915,786 | A |   | 6/1999  | Kotani |
| 6,585,515 | B1 |   | 7/2003  | Roy et al. |
| 7,121,982 | B2 |   | 10/2006 | Feldman |
| 7,350,787 | B2 |   | 4/2008  | Voss |
| 7,387,513 | B2 |   | 6/2008  | Makuta et al. |
| 8,248,367 | B1 |   | 8/2012  | Barney et al. |
| 8,287,394 | B2 |   | 10/2012 | Gil et al. |
| 8,298,845 | B2 |   | 10/2012 | Childress |

(Continued)

FOREIGN PATENT DOCUMENTS

EP           0406729          11/1996

*Primary Examiner* — James S McClellan
*Assistant Examiner* — Kevin Carter
(74) *Attorney, Agent, or Firm* — Marsh Fischmann & Breyfogle LLP; Kent A. Lembke

(57) ABSTRACT

An interactive system adapted for lean-based control of ride or video game experiences. The system includes a vehicle seat and a motion base with a vehicle base upon which the vehicle seat is mounted. The system includes an actuator assembly moving the vehicle base and seat. A control system interprets sensor input signals and generates control signals to operate the actuator assembly to move the vehicle base and seat. Force sensors positioned in the vehicle seat sense forces applied by the passenger to the vehicle seat and transmit sensor data signals to the control system. The control signals operating the driver assembly are generated based on the sensor data, which is output from left and right sensors provided in a bench of the vehicle seat as well as in a front and a back support to provide X and Y-axis values based on passenger leaning in the vehicle seat.

16 Claims, 8 Drawing Sheets

(56) References Cited

U.S. PATENT DOCUMENTS

| | | |
|---|---|---|
| 2004/0222892 A1* | 11/2004 | Balaban et al. ............ 340/573.7 |
| 2005/0069839 A1* | 3/2005 | Denne ............................. 434/29 |
| 2007/0122793 A1* | 5/2007 | Orban et al. .................. 434/365 |
| 2007/0123390 A1* | 5/2007 | Mathis ............................... 482/8 |
| 2008/0081706 A1* | 4/2008 | Zamperla et al. ............... 472/44 |
| 2009/0002184 A1* | 1/2009 | Lenneman et al. ........... 340/665 |
| 2012/0108333 A1* | 5/2012 | Radek et al. .................... 463/36 |
| 2012/0280902 A1 | 11/2012 | Persaud et al. |
| 2012/0283929 A1 | 11/2012 | Wakita et al. |
| 2013/0249262 A1* | 9/2013 | Herman et al. ............ 297/217.1 |

\* cited by examiner

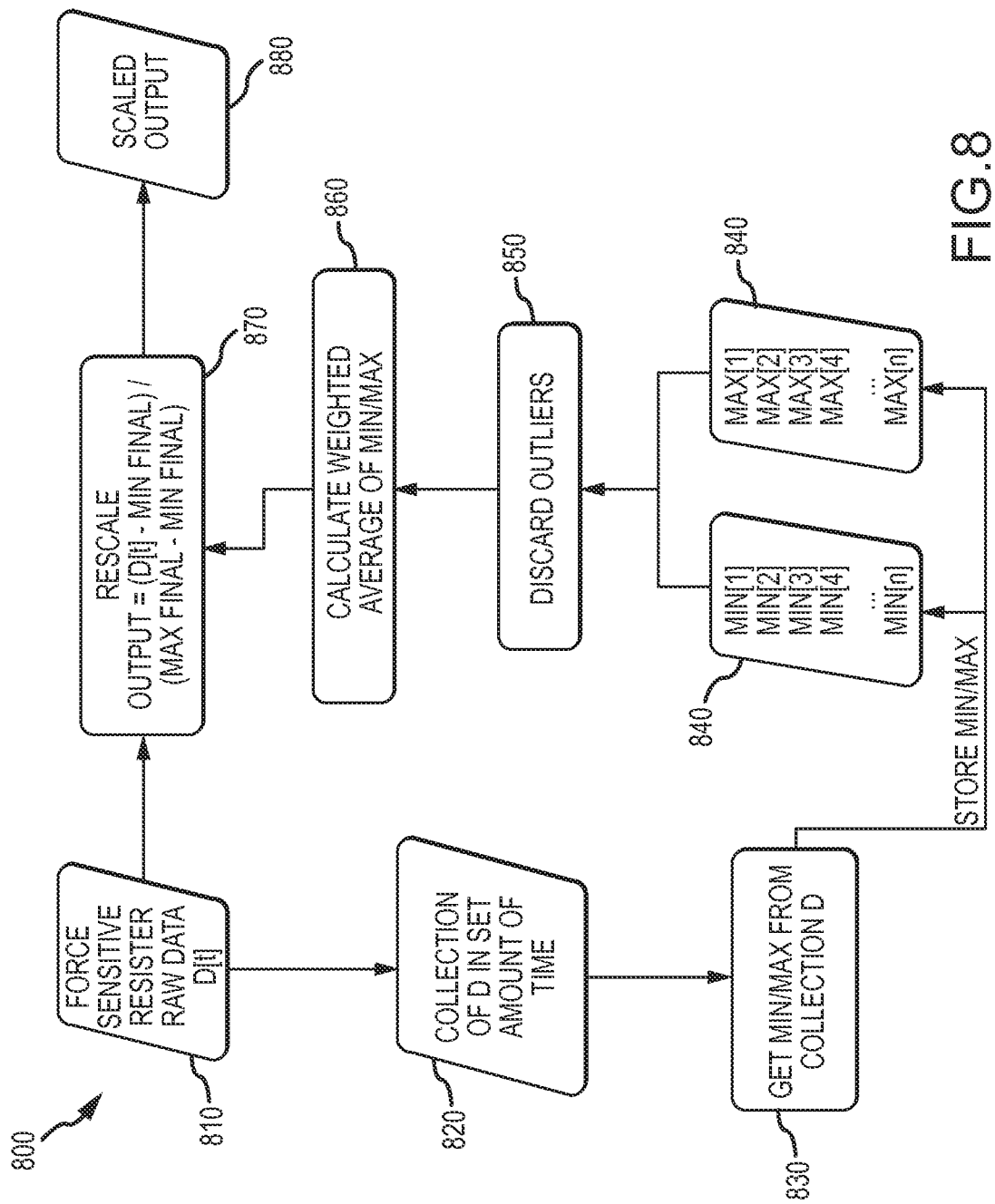

INTERACTIVE LEAN SENSOR FOR CONTROLLING A VEHICLE MOTION SYSTEM AND NAVIGATING VIRTUAL ENVIRONMENTS

BACKGROUND

1. Field of the Description

The present invention relates, in general, to devices allowing operators to interact with a virtual environment such as that provided in a video game, and, more particularly, to methods and systems for allowing an operator (e.g., a player of an interactive video game or a passenger on an amusement park or theme park ride experience) to navigate through a virtual environment and to control movement of a vehicle (or motion base simulating movement) in a more natural manner and/or in a way that suited the vehicle theme or mode of transport being mimicked in the video game or park ride (i.e., inappropriate to have a steering wheel or joystick on an animal vehicle or in many simulated spacecraft).

2. Relevant Background

In recent years, video games and amusement park rides have been developed that allow a player or operator to interact with the game or ride so as to navigate their way through a virtual environment displayed on one or more nearby screens. Unfortunately, the controllers that have been implemented often do not feel natural or mimic operation of the vehicle or mode of transportation being simulated in the virtual environment or ride experience.

For example, the virtual environment may be simulating flying on the back of a dragon or riding on the back of a walking or running animal. In these cases, there would be no steering wheel or joystick on the dragon or animal, but most interactive video games and ride experiences still rely on such types of inputs to allow the rider or player to provide inputs to direct movement of their "vehicles."

In some cases, a wireless controller (e.g., a Wii® Remote or the like) may be provided that allows the control system to detect movement in three dimensions and translate the player's movement of the wireless controller into interactive onscreen actions in the virtual environment. However, again, this does not simulate how animals or some vehicles (such as spacecraft) are steered or controlled in the real world or in simulated environments and worlds. Video gesture control has been used to allow players or operators to have their tracked movements or gestures used as input to interact with a computer display or interactive video game. These systems, though, lack expected tactile feedback that is useful for allowing a player or operator to feel like or know that they have provided input to steer a vehicle (such as a flying animal, a spacecraft, or the like) through an environment. Tactile feedback or physical motion of the "vehicle" that is directly tied to operator input also increases a sense of realism and immersion into the experience.

There is an ongoing need for new and intuitive ways to control motion through a digital environment. Preferably, such motion control systems and methods would not involve use of conventional input devices such as joysticks, video game controllers, or gamepad controllers. It would be desirable for the motion control system to be interactive and provide a more natural way to steer a vehicle that fits within the virtual environment or ride experience theme (e.g., flying or riding an animal or other vehicle that would not have a joystick or gamepad controller). For example, there are many applications where it would be desirable for the operator (rider, player, or the like) to use their body to indicate the direction they wanted to go within a virtual world or environment rather than manipulate a physical device or use one or both of their hands.

SUMMARY

The following description addresses the above and other issues by providing an interactive system (e.g., a ride or game system) with a vehicle motion control assembly that includes an interactive lean sensor. The lean sensor allows a game or experience controller to navigate a virtual object (or vehicle, which may take the form of an animal, a motorized vehicle, or the like) through a digital environment. The system senses operator or rider input and, then, interprets this information to provide input to drive actuators on a motion base, which is operated to give the rider or operator the sensation of motion. The operator-provided input further indicates the direction and/or speed the operator wants to proceed on their vehicle through the virtual environment and can initiate other activities that effect the virtual environment such as "fire gun," "punch," "kick," and the like.

In brief, the lean sensor (or sensor assembly) is provided by placing an array of pressure sensors on a seat of a physical vehicle (e.g., the object simulated as moving through the virtual environment on a nearby screen(s)). The pressures sensors are operated to continuously sense rider (or operator) weight distribution and also posture and how these change over time. This data related to the leaning or similar movement of the vehicle operator is relayed to the game system or controller. The game system applies a custom algorithm to this raw or lean data and then generates and communicates motion commands to a motion base supporting the vehicle to drive actuators to move or reposition the vehicle in response to the vehicle operator's input (amount and direction of their leaning or movement in the vehicle seat). The game system also may act to update the displayed virtual environment in response to the operator's input by changing, for example, visuals provided on a display screen/monitor (or screens and display surfaces) by changing camera position or actual environmental characteristics within the virtual environment.

In prior game systems, interactivity was achieved with a player or operator operating game controllers, joysticks, handheld devices with accelerometers, keyboards, a mouse, and the like. In some cases posture sensing systems were used to determine driver positions, but none were used as an analog input device to drive actuators or otherwise control physical motion of a motion base supporting a vehicle seat containing the operator or rider. The interactive systems described herein, in contrast, are configured to allow very intuitive navigation through a digital model or environment. Testing has shown that the seat-based input device provides a fun and unique way to control a vehicle. The interactive system taught herein uses on-board sensors to derive guest intent and then to drive visuals and physical motion of the vehicle to convince the guest that they are moving through a real environment. Prior systems, in other words, simply take "change in physical position" input of a physical device (such as a joystick, a steering wheel, or the entire vehicle) and directly change the visuals to correspond with this input, which represents a significant difference from the interactive systems presented with this application.

More particularly, an interactive system is provided that is adapted for lean-based control of a ride or video game experience. The system includes a vehicle seat for physically supporting a passenger within the interactive system (and, of course, the vehicle seat may be provided within a vehicle body). A motion base is provided with a vehicle base (e.g., upon which the vehicle seat is mounted) and with a driver assembly selectively providing movement to the vehicle base and the vehicle seat. The interactive system further includes a control system generating and communicating control signals to operate the driver assembly to initiate the movement of the vehicle base and the vehicle seat. Lean control is achieved by including a plurality of force sensors positioned in the vehicle seat to sense forces applied by the passenger to the vehicle seat and, in response, to transmit sensor data signals to the control system. Typically, the control system includes a sensor input processor processing the sensor data signals, and the control signals operating the driver assembly are generated based on the processed sensor data.

In many implementations, the vehicle seat includes a saddle or bench upon which the passenger sits, and the force sensors include an array of at least one left sensor and one right sensor. Then, the sensor input processor compares a force applied to the at least one left sensor (by the passenger's left buttock and/or left upper thigh) with the force applied to the at least one right sensor (by the passenger's right buttock and/or right upper thigh), whereby direction and magnitude of side-to-side leaning by the passenger in the vehicle seat provides user input for use in controlling the driver assembly. In these implementations, the sensor input processor processing includes determining an X-axis value using a differential provided by the comparing step/function. The control signals operating the driver assembly are generated using the X-axis value to determine an amount of roll or turn and lateral acceleration of the vehicle base.

In some implementations, the vehicle seat includes a back restraint/support, with an inner contact surface receiving a back portion of the passenger, and a chest restraint/support, with an inner contact surface receiving a front portion of the passenger. The force sensors include a sensor on the inner contact surface of the back restraint and a sensor on the inner contact surface of the front restraint. Then, the sensor input processor processing includes comparing a force applied to the front restraint sensor with a force applied to the back restraint, whereby direction and magnitude of front-to-back leaning by the passenger in the vehicle seat provides user input for use in controlling the driver assembly. In such implementations, the sensor input processor processing includes determining a Y-axis value using a differential provided by the comparing. The control signals operating the driver assembly are generated using the Y-axis value to determine an amount of pitch and heave of the vehicle base.

In some embodiments, the control signals operating the driver assembly are generated based on the processed sensor data with a commanded motion of the vehicle base being indirectly related to inputs by the passenger to the sensors (e.g., not a one-to-one correlation between input and movements). The interactive system may also include a display system displaying images associated with the ride or video game experience. In such an embodiment, the control system generates signals controlling the display system based on the processed sensor data (e.g., a projected or displayed video game image may be altered based on the passenger's amount and direction of leaning in the vehicle seat such as by changing projection direction or angles on a display surface positioned in front of or surrounding the vehicle seat).

BRIEF DESCRIPTION OF THE DRAWINGS

FIG. 8 is a flow chart showing flow of data in the lean-based control method of the present description such as may be implemented within the system of FIG. 2.

DETAILED DESCRIPTION

Figure 1:
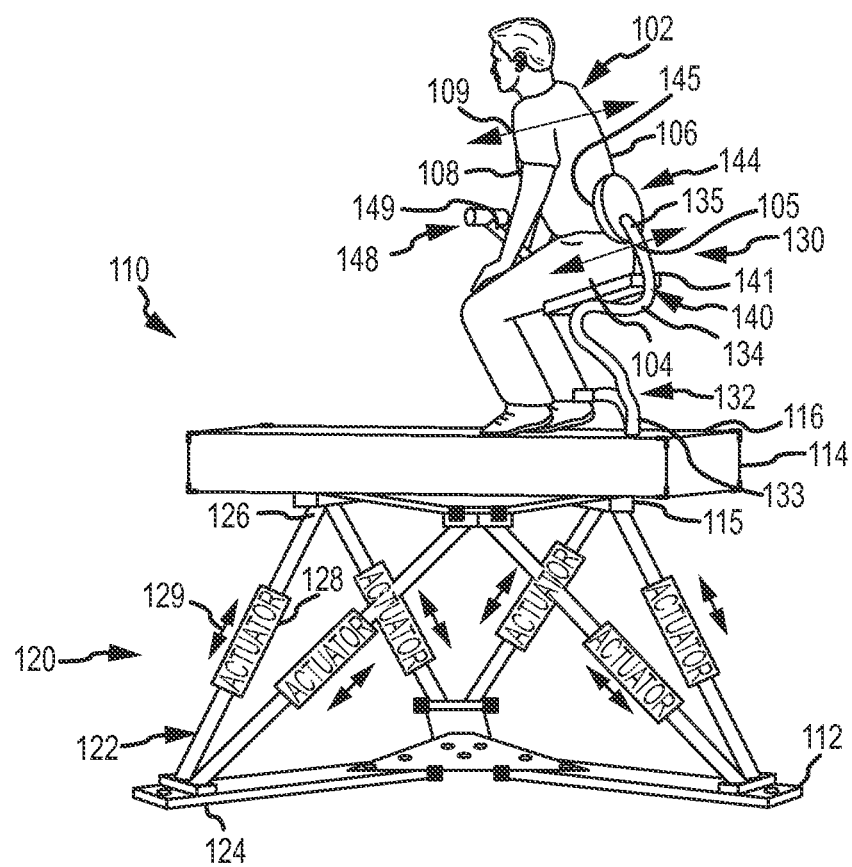
FIG. 1 illustrates a portion of an interactive system of the present description showing one useful motion base supporting a passenger seat (as would be provided in or on a vehicle) that would be used to place an array of sensors into contact with a passenger (or rider or operator)

Briefly, the present description is directed toward an interactive system (e.g., a ride or game system) with a vehicle motion control assembly that includes a lean sensor assembly (or sometimes called an interactive lean sensor). This system has been mocked up and tested with a wide variety of passengers with varying body types. The system functioned to provide consistent control over the interactive experience and was intuitive to use, with most people acting as test riders or operators needing no more than a few seconds of instruction to properly operate the lean sensor assembly to control movement of their "vehicle" (which may be any object such as spacecraft, a vehicle with wheels, or even an animal).

The interactive system (and corresponding methods) may be briefly described as including an array of pressure sensors embedded or attached to a seat such that the sensors are each in contact with a passenger or operator supported by the seat. A "seat" in this description is intended to include nearly any device configured to support a person in a seated position and may include a bench for receiving and supporting the person's buttocks, a back support, and a front/chest support (or the front/chest support may be replaced, in some cases, with a passenger restraint device attached to the bench and/or back support). The pressure sensors may be provided on the bench and back and front supports or even on the ground under the passenger's feet. In this manner, pressure or forces may be sensed to detect side to side movement or leaning of the operator or passenger as well as forward and backward leaning (or posture changes). The sensors may be thought of as providing inputs similar to a two-axis joystick, e.g., the bench sensors provide the X-axis inputs while the back and front supports (or vertical supports) provide the Y-axis inputs to a game system (or controller).

The interactive system includes a motion base that is attached to and supports the seat. The motion base is adapted to be operated to move the seat with one or more degrees of freedom, with some exemplary embodiments including actuators that are selectively driven with control signals from the game system/controller to provide a six degree of freedom motion base in order to give the sensation of motion as well as direction through a virtual environment.

The interactive system includes a game system (or control system or controller) that receives the sensor input indicative of changes in the body position and posture of an operator sitting in the seat. The game or control system includes software and/or hardware to translate this sensor information into motion commands that are sent in a wired or wireless manner to the motion base (or its actuators). For example, the control system may include a module or algorithm that scales and filters the sensor input data to create the motion commands (actuator control signals).

The interactive system further may include a display system that may include one or more displays/screens/monitors operable to display images associated with a virtual environment and a sound system for outputting corresponding audio tracks and/or special effect sounds. The display system may operate to give the passenger or operator of the vehicle a visual sense of motion through a digital environment directly related to the physical motion they are presently experiencing based on their control of the vehicle on its motion base.

FIG. 1 illustrates a portion 110 of an interactive system that may implement the interactive lean sensor concepts for controlling navigation of a vehicle through a digital or virtual environment as part of a video game or ride experience. The portion 110 may be labeled the motion base or motion base assembly of the interactive system, and the motion base 110 includes in this example a lower platform 112 and an upper platform or vehicle base 114. In many cases, a vehicle body such as a body of an animal, an existing or futuristic vehicle, or the like may be supported upon and extend upward from the vehicle base 114.

In operation of the motion base 110, the base 114 is static or motionless a distance above the lower platform 112 unless it is moved by the base actuator assembly 120. In other words, the vehicle base 114 does not move in direct response to movement of a passenger or operator 102 but only in response to operation of the actuator assembly 120. The base actuator assembly 120 may be implemented in a large variety of ways to provide one or more degrees of freedom of movement to the vehicle base 114, and the motion base 110 is not limited to one particular implementation for selectively moving the vehicle base 114.

However, it may be useful to describe one useful implementation for assembly 120 as illustrated in FIG. 1. As shown, the assembly 120 is adapted to provide movement of the vehicle base 114 with six degrees of freedom of motion. To this end, six independently controllable actuatable supports or drivers are used to support the vehicle base 114 a distance above the lower platform 112. Each of these may take the form shown for actuatable support or actuator mechanism 122.

The actuatable support 122 is shown to be attached at a first end 124 to the lower platform 112 and at a second end 126 to a lower surface 115 of the vehicle base 114. The actuatable support 122 further includes an actuator 128 for applying a force to the vehicle base 114 as shown with arrows 129 at attached end 126. For example, the support 122 may include a rigid rod pivotally attached at end 126 to the base 114, and the actuator 128 may be operable or driven in response to control signals from a game or control system/controller to move the rod to increase or decrease the length of the support/leg (e.g., to cause the end 126 to move toward or away from the lower platform 112). As shown, two of the actuatable supports may be attached proximate to each other on the lower base surface 115, with the paired contact points for these supports defining a triangular pattern. Then, movement of the actuatable supports such as support 122 can be used to drive the vehicle base 114 through a variety of movements with pitch, roll, heave, and yaw.

The drive or actuator assembly 120 is operated based on operator or rider inputs provided by a passenger or operator 102. As shown, the passenger 102 is positioned on or supported on the vehicle base 114 on upper surface 116, and the passenger 102 provides input by leaning to the left or right as shown with arrow 105, which causes more or less weight to be applied to their left or right side (or left or right buttock). Further, the passenger 102 may lean back or forward as shown with arrow 109, and this causes more force or pressure to be applied by their back 106 or their chest/stomach 108 on any resisting/support structures.

Such movements 105, 109 can be used by the passenger 102 to provide navigation inputs in an intuitive and hands-free manner, which may be desirable for simulating the type of control that may be used in many "vehicles" such as a flying or walking animal or many existing or futuristic machines provided in video games and ride experiences. To support the passenger 102 and allow them to provide navigation input with leaning-type movements 105, 109, the motion base 110 further includes a passenger support frame 132 that is typically rigidly attached at a lower or first end 133 to the upper surface 116 of the vehicle base 114.

As discussed below, the system 110 will include an array of sensors to detect the movement 105 and/or the movement 109. With this in mind, a vehicle or passenger seat is provided that is made up of a seat bench 140 attached to a mid portion 134 of the frame 132 and arranged with an upper contact surface 141 for receiving and supporting the passenger 102 (e.g., support the passenger's buttocks and/or upper thighs 104). Typically, most of the passenger's weight will be supported by the seat bench 140, and a number of sensors are provided in the seat bench 140 such that a portion is provided on surface 141 to contact the passenger's buttocks/thighs 104. When the passenger 102 moves or leans to the left or right as shown at 105, their buttocks/thighs 104 remain in contact with the seat surface 141 but the amount of pressure at various locations on the surface 141 changes (and such a change is sensed by the two or more sensors on the surface 141).

Further, the vehicle seat includes a back support or rest 144 with an inner contact surface 145, and when the passenger 102 leans back as shown with arrow 109 the passenger's back 106 applies more force to this surface 145. One or more sensors of the sensor array may be provided in the back support 144 such as with a portion exposed on surface 145 to sense a force applied by the back 106 during the backward leaning 109. Likewise, the seat may include a front or chest support 148 with an inner contact surface 149 that is positioned such that the passenger's chest/stomach 108 applies pressure to the surface 149 when the passenger leans forward as shown with arrow 109. To sense this leaning 109 and changes in applied force/pressure, one or more of the pressure sensors of the sensor array may be provided on the front support 148 with a portion exposed on the contact surface 149.

Figure 2:
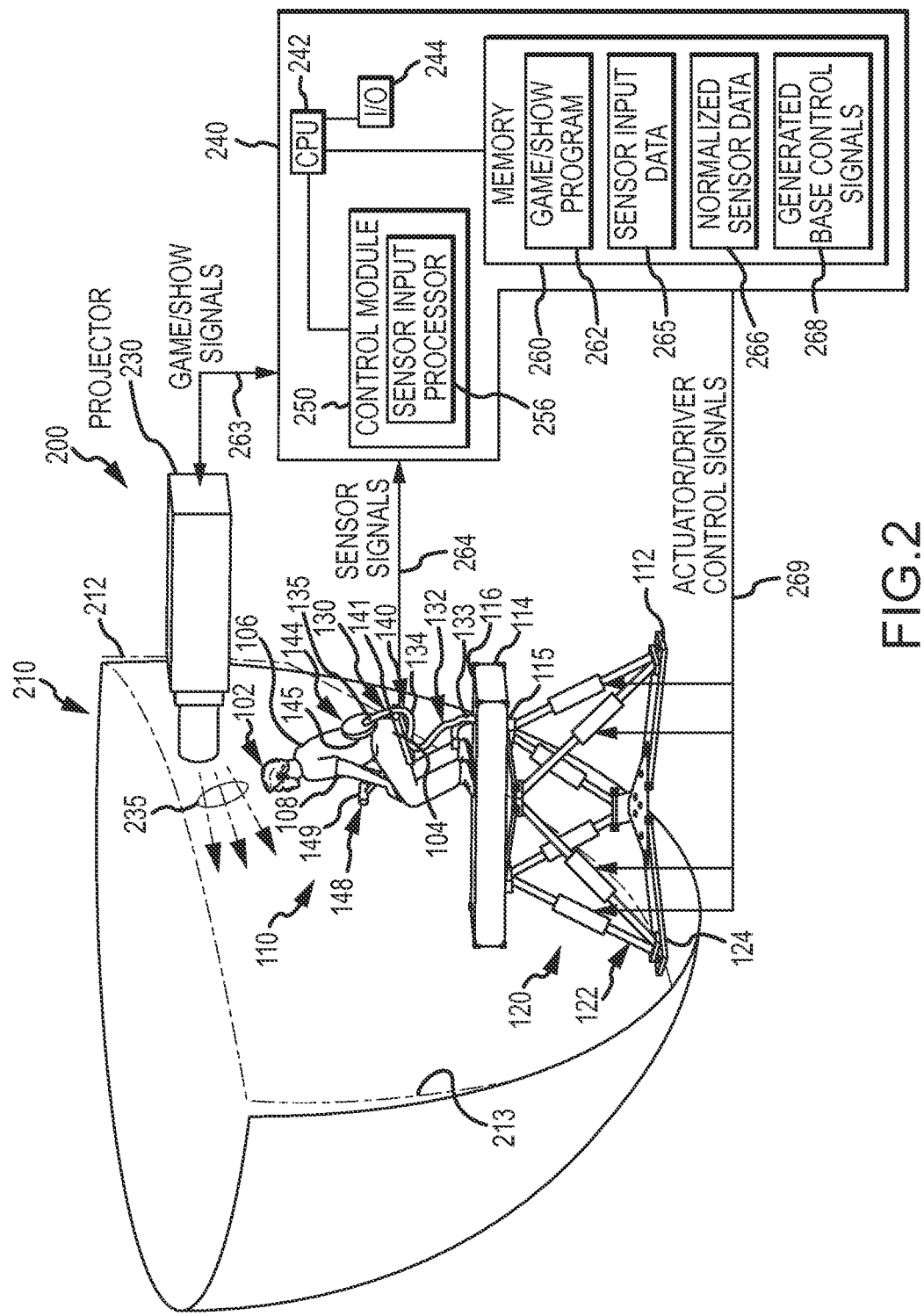
FIG. 2 illustrates with a schematic or functional block drawing an interactive system that uses the motion base of FIG. 1 to provide an interactive experience to a passenger of a vehicle.

FIG. 2 illustrates a simplified interactive system 200 that may utilize or include the motion base 110 of FIG. 1 to provide a unique interactive vehicle navigation experience to the operator or passenger 102. As shown, the motion base 110 is positioned within or adjacent a display assembly 210 that includes a display screen 212 providing a display surface 213. A projector 230 is also provided that is operable by a control system 240 via control signals 263 to display or project 235 game or ride imagery, which may be stored in memory 260 and defined by a game/show/ride program 262. In other systems 200, the display assembly 210 may include one or more monitor or display devices such as liquid crystal display (LCD) or other display elements and the projector 230 may be eliminated in such embodiments of the system 200.

The motion base 110 is positioned and operable such that the passenger 102 in the vehicle seat is typically facing toward or into the screen 212 and display surface 213. However, the projector 230 or its imagery 235 may be varied during operation of the system 200 in response to sensor data 264 collected from a sensor array in the vehicle seat (e.g., in bench 140 and/or front and back supports 144, 148) as the passenger 102 moves or leans to provide navigation input for a vehicle being simulated by the system 200 in part with projector 230 and display screen 212.

The interactive system 200 includes a control system 240 that may take the form of a computer or similar electronic device(s) that is adapted for the special purpose of performing the sensor data processing functions and the functions of controlling the display assembly 210 and the motion base 110 in response to the sensor data processing. To this end, the control system 240 is shown to include a processor 242 that functions to execute code or instructions in computer readable media (such as data storage or memory 260) to provide such functions. For example, the processor 242 may execute code to provide the control module 250 that is useful for running a game/show program 262 that provides images that can be provided selectively (e.g., depending on a game state or input from passenger 102) to the projector 230 as shown with game/show signals 263.

The control module 250 is also shown to include a sensor input processor or module 256 that is adapted to process (as described herein) raw data from the array of pressure or force sensors provided on the vehicle seat of the motion base 110. To this end, the control system 240 may include input/output devices 244 managed by the processor 242 for receiving sensor signals 264 from the sensor array on the motion base 110. This raw sensor data is stored in memory 260 as shown at 265. The sensor input processor 256 then is used to process this data 265 to produce processed or normalized sensor data 266 that can be used by the control module 250 (such as for input to the game/show program 262) to generate motion base control signals 268. The motion base control signals 268 are transmitted as shown at 269 to the actuator or driver assembly 120 of the motion base 110 to cause the actuators/drivers (such as actuator 128) to provide the vehicle base 114 motion with one or more degrees of freedom (with 6 degrees of freedom shown in FIGS. 1 and 2 for vehicle base 114).

As will be appreciated from the discussion of the components of FIGS. 1 and 2, a lean controller is provided that is built or designed to mimic a 2-axis joystick input. In some particular implementations, the output 266 from the sensor input processor 256 may be a normalized decimal value, for example, between +1 and −1 in both the X (side-to-side lean) and Y (front-to-back lean) directions. These values are then interpreted by the control module 250 and/or game/show program 262, such as by reacting to X input to generate and provide roll, turn, and lateral acceleration values via control signals 269 to the motion base 110 (or its actuator/driver assembly 120) and by reacting to Y input to generate and communicate pitch and heave values via control signals 269 to the motion base 110 (or its actuator/driver assembly 120).

As has been discussed, one problem faced by the inventors was how to provide sensing hardware to detect lean (e.g., hands free) gestures or movements. A challenge is that the sensing hardware should be able to support multiple body shapes, masses or passenger weights, and postures. Further, it was recognized by the inventors that there is a large discrepancy in how people lean, and, if their leaning movements were to be used as navigation input for an interactive ride or video game, the sensing hardware (or associated software) had to be able to account for such variances.

Figure 3:
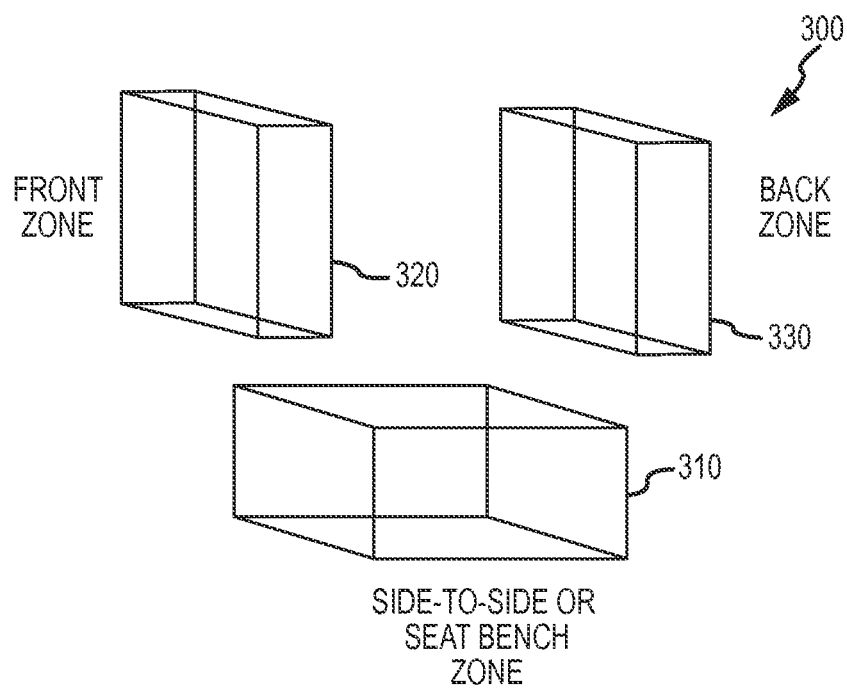
FIG. 3 is a schematic illustration of three zones that may be used for locating an array of force or pressure sensors to obtain full lean and/or posture data for a passenger in a vehicle seat.

With these issues in mind, a sensor array may be provided that includes multiple force sensors that are located in one to three or more sensing zones so as to gather adequate side-to-side lean and front-to-back lean data from a passenger/operator seated in a vehicle seat. For example, FIG. 3 shows with a functional block drawing a sensor array layout 300 that may be used to determine how to place or position sensors for detecting lean by a seated passenger, rider, or operator.

As discussed above, it is desirable to obtain side-to-side leaning or weight-shifting data, and this is obtained by placing one or more sensors in a side-to-side or seat bench zone 310. This may involve placing a set of sensors in or on the seat bench or seat cushion/pad of a vehicle seat, and the sensors may generally be thought of as being in a horizontal plane while in practice they are placed so as to follow the contours of the seat bench's upper surface. To detect front leaning, one or more sensors may be placed in a front zone 320 where it is anticipated a passenger/operator will position and move/lean their chest/stomach during a ride or video game experience. To detect backward leaning, one or more sensors may be placed in a back zone 330 where it is anticipated a passenger/operator will position and move/lean their back during the ride or video game experience. Front and back supports may be placed within these front and back zones 320, 330 to allow the sensors to be placed to contact the passenger/operator during operations of a motion base supporting a vehicle with vehicle seats containing the sensors. These sensors may generally be thought of as being placed in spaced-apart planes that are transverse to the plane containing the sensors used to detect side-to-side leaning (and may be orthogonal or nearly so to such a lower, horizontal plane). Again, though, the front and back lean sensors typically will be placed to conform to the contours, which may be non-planar, of the front and back supports or pads provided on such supports.

Figure 4:
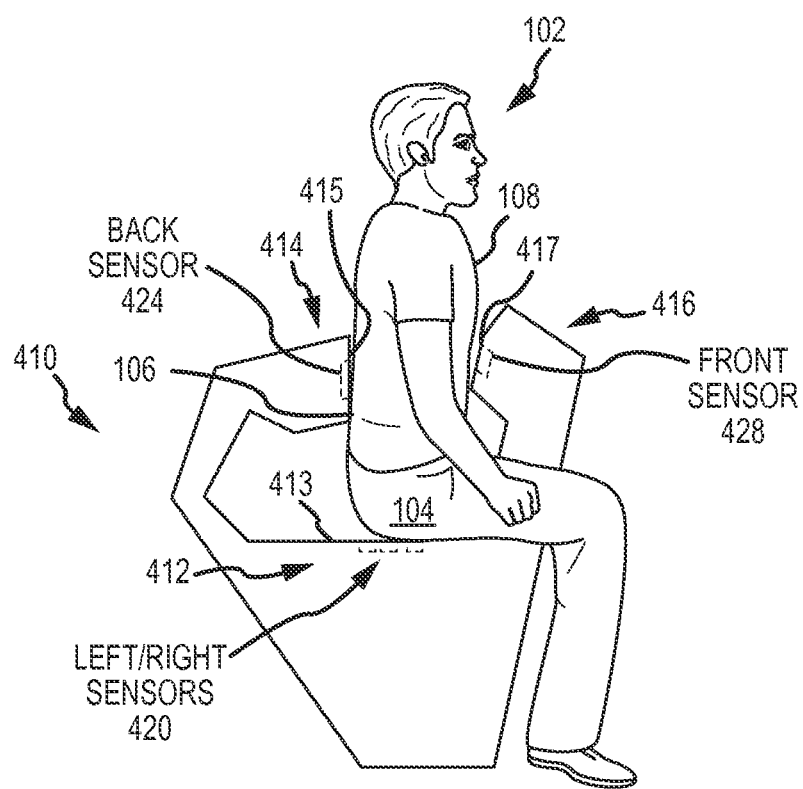
FIG. 4 is a side view of a vehicle seat including a sensor array or assembly for sensing leaning or changes in weight distribution and posture of a passenger or operator.

FIG. 4 illustrates a vehicle seat 410 that may be provided in a motion base (such as motion base 110) of FIGS. 1 and 2 to facilitate lean-based control as described herein. As shown, the passenger or operator 102 is supported within the vehicle seat 410 with their buttocks and/or upper thighs 104 supported by a bench 412 of the seat 410. Further, when the passenger 102 leans backwards, their back 106 comes into contact with and applies pressure against a back rest or support 414. Similarly, when the passenger 102 leans forwards, their chest/stomach comes into contact with and applies pressure to a front or chest rest/support 416.

A sensor array is provided in the vehicle seat 410 that includes two or more sensors 420 in or extending through the upper surface 413 of the seat bench 412 that act as left and right sensors sensing left and right leaning or shifts in the weight of the passenger 102 (or movement lower body portion 104). The sensor array also includes one or more back sensors 424 placed in or extending through inner/contact surface 415 of the back support 414 and further includes one or more front sensors 428 placed in or extending through inner/contact surface 417 of the front support 416 (e.g., both sensors 424, 428 may be placed in the center of the support surface 415, 417 or a lower center area or other position that is designed to contact the passenger 102). The back and front sensors 424, 428 act to sense an amount of pressure or force applied by the passenger 102 to the front and back supports 416, 414 during operation of an interactive experience that includes the vehicle seat 410. The seat 410 may be configured such that the back support surface 415 and sensor 424 are continuously in contact with the passenger's back 106 and such that the front support surface 417 and sensor 428 are continuously in contact with the passenger's front/chest 108 such as with one or both supports 414, 416 being actuated or held in place with spring or resilient members (not shown). Alternatively, as shown, the passenger 102 may move in and out of contact with the surfaces 415, 417 and the sensors 424, 428 contained therein.

Figure 5:
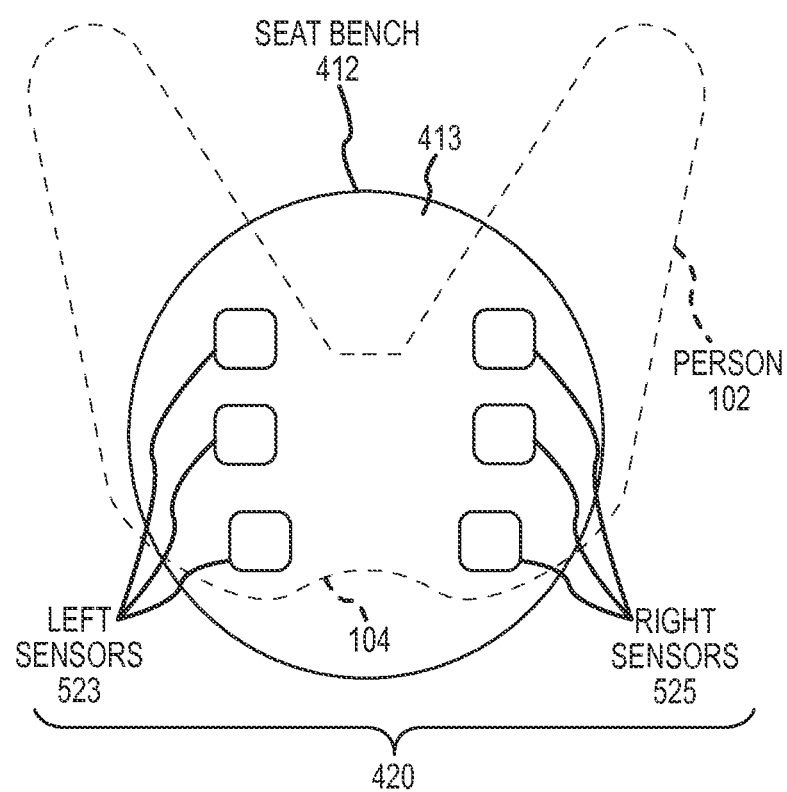
FIG. 5 is a partial top view of the vehicle seat of FIG. 3 showing one useful arrangement for the sensors of the sensor array provided in the seat bench.

As discussed, it may be appropriate to only use a single force or pressure sensor to obtain the backward leaning forces and another single sensor to obtain the forward leaning forces. However, it typically will be desirable to use two or more sensors in the seat bench 412 to gather side-to-side leaning or shifts in the passenger's weight. For example, FIG. 5 shows a partial top view of the seat 410 of FIG. 4 showing the seat bench 412 with the seated passenger 102 in a ghosted manner so as to provide a view of the left and right sensor set 420. This sensor set 420 is arranged into a first set of sensors 523 and a second set of sensors 525 that may be considered the left and right sensors 523 and 525, respectively. To obtain useful left and right weight change or leaning data, the sensors 523, 525 are shown to be arranged linearly in a spaced apart manner to coincide generally where the passenger's left and right buttock and/or upper thighs 104 will contact the upper seat surface 413 when the passenger 102 is seated in the vehicle seat. In this embodiment, three sensors are provided in each of the left and right sets 523, 525 and these are spaced apart to cover the anticipated contact area between the seat surface 413 and the passenger 102. Often, the arrangement of the left/right sensors 420 may be selected to suit the smaller of the anticipated passengers such that contact is achieved for such passengers (which will also result in larger sized passengers also being in contact with these sensors 523, 525).

As can be seen with this example, multiple force sensors are used in the sensor array with eight total sensors used to gather left-to-right leaning and forward-to-backward leaning data from a passenger seated in a vehicle seat. Six sensors are used to detect sagittal (left/right) motions and are placed on the seat bench or saddle (i.e., three on the left side and three on the right side), such that the output of these sensors contributes to the normalized X-axis value obtained by the sensor data processor/algorithm. Two sensors are used to detect frontal (forward/backward) motions of the passenger (i.e., one sensor on the chest or front support/restraint and one sensor on the back restraint/support), such that the output of these sensors contributes to the normalized Y-axis value obtained by the sensor data processor/algorithm. In practice, soft foam or other material coverings or pads may be used to dampen the force applied to the sensors and to distribute the force/pressure applied to the sensors by the passenger/operator (and, thereby, the readings) across multiple sensors in the sensor array.

Figure 6:
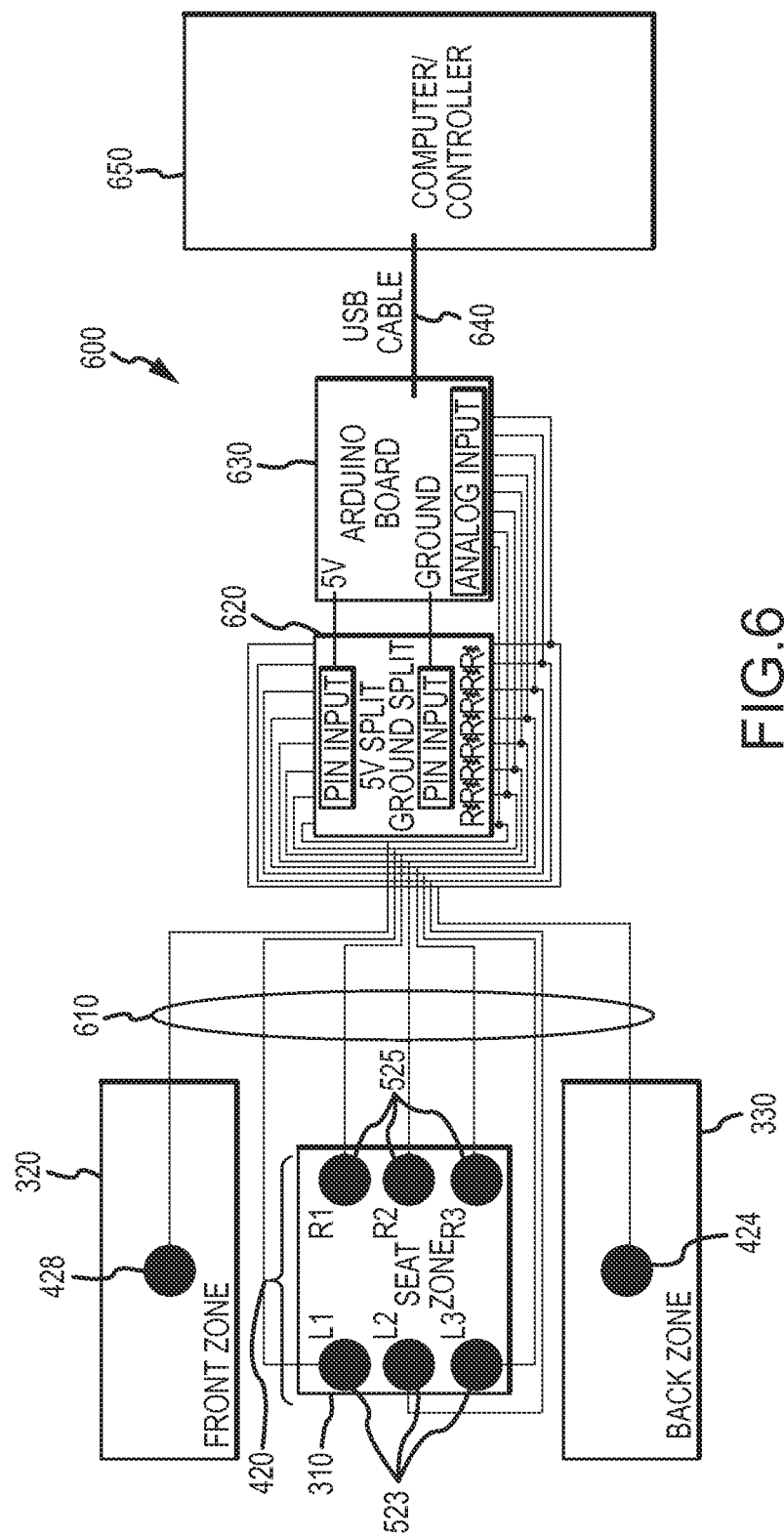
FIG. 6 is a sensor hardware wiring diagram for use in one exemplary interactive system.

FIG. 6 provides a sensor hardware wiring diagram 600 for use in one exemplary interactive system (such as system 200 of FIG. 2), with components shown in FIGS. 3 to 5 having like numbering. Particularly, the sensor array is shown to include a back sensor 424 placed in a back zone 330, a set 420 of left sensors 523 and right sensors 525 in a seat (seat saddle or bench) zone 310, and a front sensor 428 in a front zone 320. The sensors may take a wide variety of forms to provide the function of sensing pressure or force applied to a location on the vehicle seat. A general term may be "force sensors" that may be a transducer that converts an input mechanical force into an electrical output signal that is provided on lines 610 (e.g., 2-wire ribbon cable or the like). For example, the force sensors 420, 428, 424 may be load cells, pressure mats, force sensitive resistors (e.g., strain gauge load cells), piezoelectrical crystal load cells, pressure sensitive load cells, or other sensor types (e.g., elastic, magnetic, vibrating, plastic deformation, and the like).

Each of the eight force sensors 420, 424, 428 in the sensor array is connected to a board via a power supply 620. Particularly, for example, each sensor 420, 424, 428 may be linked with wire 610 to an open source Arduino Board 630 with each having two connection points with one wire leading from the sensor to a 5-Volt power supply 620 from the board 630 and a second wire leading from the sensor through a resistor to ground on the board 630. A third wire can be connected from the ground wire of the sensor to an open analog pin on the board 630.

The system 600 may be programmed with software run on computer/controller 650 (which is linked to the board 630 via a cable 640 (e.g., a USB cable or the like) such that the board 630 interfaces with the controller 650 through a serial port via USB) to read the values from the analog channel where values are seen ranging from 0 to 1024 depending on the force being applied to each of the sensors 420, 424, 428 in the sensor array of the vehicle seat. With the Arduino interface, each sensor outputs a value in the range of 0 to 1024, with 0 representing no contact or no force/pressure on the sensor and 1024 representing a full force or pressure touch/contact from the passenger/operator in the vehicle seat. The controller 650 processes the sensor data and responds by generating and sending control signals (e.g., network UDP messages) to the motion base driver/actuator assembly (or to a separate control system that may control the motion base in response to the processed sensor data as the motion base control computer may use its own motion queuing algorithm to control the motion base).

With the layout of an interactive system along with the sensor array and data collection hardware understood, it may be useful to turn to a description of the methods for processing the sensor data to generate useful motion base control signals/data. There are a number of challenges or problems associated with using the sensor array data as navigational or motion base control input. First, feedback loops in force sensors and motion base movement can cause cascading movements. Force sensors detect forces the human body exerts on the vehicle seat caused by gravity. As the entire system moves and changes, so does the detected force as the human body reacts to the forces imparted on the body. This feedback leads to incrementally larger movements of the motion base and incrementally larger reactions from the human body (i.e., the passenger or operator of the interactive system).

Second, people of different masses, shapes, and posture need to be able to use and interact with the system (e.g., have their leaning result in useful control over movement of the motion base by a control system). Absolute force detection would undesirably provide a large discrepancy between people of different masses. Absolute ranges also cause problems as people have different postures while leaning. Some people tend to lean more with their hips and legs while others lean more with their waist and shoulders, which can lead to drastically different absolute readings from force sensors provided in an array on a vehicle seat as described herein.

A third problem is that noise in the form of very large readings in the sensors for a short amount of time (impulse/impact readings) comes from both sensor noise as well as large jerks from the motion base caused by sudden changes in the motion. These sudden changes are user driven, and, hence, to maintain the passenger/operator's feeling of control over their vehicle, the sudden changes should be preserved. These types of movements can also cause or exacerbate the feedback loops described as part of the first problem area associated with use of force sensors to allow lean-based control over vehicle movements and/or navigation through a digital environment.

The following description discusses exemplary implementations/embodiments for use in addressing these and other problems. Adaptive sensor input can be used to account for riders of varying body masses and shapes. Particularly, the sensor input processing algorithm implemented by a control module may be adapted to dynamically adjust the input received from the sensors mounted on the vehicle seat (such as the set provided on the seat saddle or bench). For each sensor, the algorithm (or processing method implemented by the software/hardware described herein) acts to find the maximum and minimum value in a periodic manner, e.g., every 0.2 seconds (i.e., each ⅕ second time slice or time slot) or other preset timeslot length. These values are used to build a statistical model that can be used to filter out any outlier values (see the second problem described above) and to calculate an average maximum and minimum value. These averages can then be used to scale and normalize the received or direct sensor value of force or pressure for each passenger or rider.

The normalized sensor values are then used to construct X and Y-axis input to drive the motion base. For example, the normalized sensor values may be used to calculate the differentials between corresponding left/right sensors and front/back sensors in the following manner. With regard to the Y-axis (or front and back leaning), there are two sensors with one for the frontward leaning and one for backward leaning. The normalized sensor value may be given by the equation: y=normalized front value−normalized back value.

With regard to the X-axis (or left and right leaning), it may be useful to use two or more for each side such 2 to 4 on each side with six total being used in the illustrated embodiment, and the use of multiple sensors is useful for accounting for people's different sizes and shapes and how their body mates with the seat bench/saddle. The X-axis sensor value may then be given as: x'=((normalized value for the first left sensor+normalized value for the second left sensor+normalized value for the third left sensor)−(normalized value for the first right sensor+normalized value for the second right sensor+normalized for the third right sensor))/3. Then, the value (x') may be scaled up by a factor greater than 1 (labeled "A" in the equation below) followed by a clamping to 1 if it is larger than 1 to account for most people/riders not hitting all three sensors on a side of the seat bench/saddle at the same time. Such processing may be given by the equation: x=min(x'*A, 1.0).

With regard to aggregation, the motion base may be commanded directly into a specific position. Mapping this directly onto the X and Y values results in very fast motions with increased feedback cascades resulting from very jerky motions. Instead, then, the X and Y values may be used as incremental additions to the current position of the motion base. This value may be clamped at or limited to specific values so as to not exceed hardware and/or software stop limits.

Figure 7:
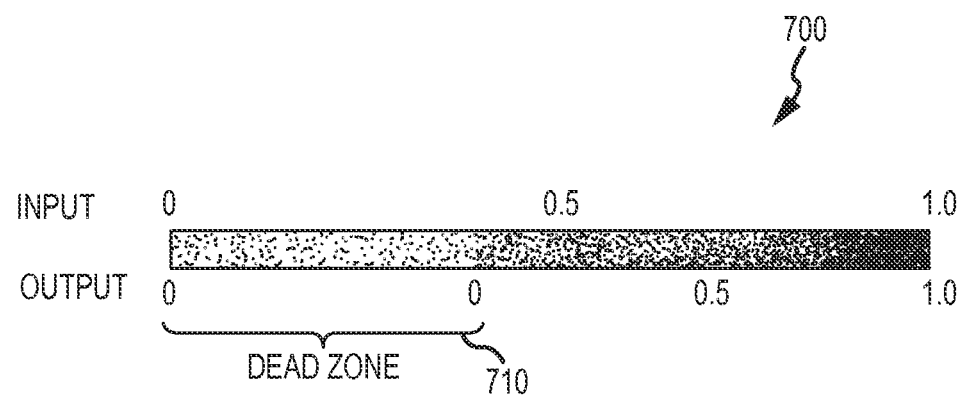
FIG. 7 is a graph for use in converting normalized sensor input into control signals for a motion base's actuator/driver assembly.

It may be useful to also consider sensitivity and dead zones in controlling the motion base based on the X and Y values determined from user input on sensors. For example, given an X value and a Y value that are normalized, traditional analog input adjustment techniques may be used to control the feel of this lean-based control system. Dead zones and clamped scaling factors can be used in some applications to adjust the overall feel of vehicle base movements in response to lean input from a passenger or operator seated in the vehicle seat. To maintain overall smoothness of motion, a scaled dead zone 710 may be used as described/shown in the input/output graph 700 of FIG. 7.

With regard to the physics behind driving the movement based on the user input, the motion base can be driven using a physics model that takes input from the X and Y values described above. Four types of movements are typically used including: pitch, roll, vertical movement, and longitudinal movement. Pitch and roll are controlled by the physics model or algorithm while vertical and longitudinal movements are secondary motions controlled by the pitch and roll. The physics model may contain the following: (a) acceleration (e.g., percentage acceleration); (b) speed (e.g., current speed that motion base is moving); (c) desired speed (e.g., the speed that the motion base is trying to reach); (d) position (e.g., current position); (e) speed limit (e.g., the maximum speed the motion base is allowed to reach); and (f) position limit (e.g., the maximum position the motion base is allowed to reach).

Then, the interpolation used in driving the motion base can be described by the following equations: (1) speed=(desired speed−speed)*acceleration; (2) speed=min(speed, speed limit); and (3) position=speed. Movement is made smoother and range of motion increased by using such interpolation as percentage acceleration. The resulting smoother motion of the motion base also helps reduce feedback loops as well as providing a smoother signal as described above. Further, braking can also be smoothed at motion limits using the following: speed=speed*braking factor.

At this point of the description, it may be useful with reference to FIG. 8 to describe a control method 800 by discussing lean controller data flow (e.g., during operation of an interactive system such as system 200 of FIG. 2 to control movement of a motion base in response to operator/passenger input by leaning against an array of force sensors). As discussed in general, the raw data (values ranging from 0 to 1024, for example) is generated by each sensor and delivered to a computer/system controller that uses a data handling algorithm to scale it based on a computed range for that sensor. This range is determined by the difference between an average maximum value and an average minimum value for that sensor. This average is updated every timeslot (e.g., every ⅕ second in some examples) and maintained over a preset time interval (such as for a 48-second interval).

At 810, the method 800 includes getting the raw force data from each of the sensors in the array of sensors provided on a vehicle seat mounted on a motion base. The method 800 may involve constructing and maintaining the average maximum and minimum values for each sensor over the time interval. At 820, it is shown that the method 800 may include maintaining a queue of structures that contain both an array of maximum values for all sensors in the sensor array and an array of minimum values for all sensors in the sensor array. Then, at 830, during each timeslot (e.g., every 0.2 seconds), the minimum and maximum values for each sensor are determined, and at 840 the new minimums and maximum values are recorded and pushed onto the queue.

At 850, the method 800 continues with discarding outliers in the sensor minimum and maximum values. For example, this may involve running a standard deviation filter on all the minimum values for each sensor and all maximum values for each sensor in the queue. This disregards values that are too far from the average of the set. At 860, the method 800 continues with calculating the weighted averages of the minimum and maximum values. This may involve calculating the averages of each sensor's maximum and minimum values in the queue. These averages are then used in step 870 as described below to scale the raw sensor input.

Note, the average is weighted such that the lowest minimum values and the highest maximum values account for the largest contribution to the average. This ensures that no exceedingly high minimum or exceedingly low maximum skews the average. Step 860 may also involve filtering the current minimum and maximum average for each sensor as a weighted combination of the last two computed averages for that sensor because this provides another layer of filtering to smooth the data.

After the collection or receipt of raw sensor data at 810, the method 800 also proceeds with step 870 to provide rescaling of the sensor output based on the calculated weighted averages of minimum and maximum values. Step 870 may involve scaling the raw input data from each force sensor by the current calculated range for that particular sensor. The range is typically the difference between the current calculated average maximum value and the current calculated average minimum value for that same sensor. Step 870 may further involve calculating the X-axis value as the normalized differential between the left sensors (e.g., 3 left sensors in some examples) on the seat saddle or bench and the right sensors (e.g., the 3 right sensors in the same examples) on the seat saddle or bench. Then, step 870 will also include calculating the Y-axis value as the normalized differential between the sensor(s) on the chest/front restraint or support and the sensor(s) on the back restraint or support. The scaled output may be stored in memory at 880 or step 880 may involve mapping these X and Y-axis values to the range of input for both roll and lateral acceleration and pitch and heave on the motion base by the system controller.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the above description stressed use of lean control over a video game or ride experience. However, the lean-based inputs and sensor data processing techniques may also be used to effectively control a physical model (e.g., not just the attached vehicle base and vehicle seat but external physical objects may be controlled with lean-based input). Further, the processes taught herein may be used for controlling special effects (not just video and audio) such as wind direction within a space containing the vehicle seat.

In prior game systems, interactivity was achieved with a player or operator operating game controllers, joysticks, handheld devices with accelerometers, keyboards, a mouse, and the like. In some cases posture sensing systems were used to determine driver positions, but none were used as an analog input device to drive actuators or otherwise control physical motion of a motion base supporting a vehicle seat containing the operator or rider. The interactive systems described herein are configured to allow very intuitive navigation through a digital model or environment. Testing has shown that the seat-based input device provides a fun and unique way to control a vehicle.

The system allows for theme appropriate interactive control of vehicles that can be themed as something other than a machine with a typical control device such as a steering wheel or joystick. The interactive system can provide experience-driven interactive experiences where the more one plays/rides the better they get at the game/experience, which provides higher game achievements and satisfaction. Such improvements and changes in the experience has proven to be extremely valuable in encouraging repeat participation in an interactive experience, e.g., repeat rides on a theme park ride or return visits to play an interactive video game.

Prior interactive video games can be thought of as allowing a user to sit upon a joystick (e.g., in the form of a motorcycle, a jet ski, or the like) that is moved by the operator to directly control a virtual avatar that looks similar to the "joystick" they are sitting upon. In contrast, the interactive systems described herein use a surrounding sensor array that is capable of providing a comprehensive model of rider/operator posture such that rider intent is determined and appropriate motion via an actuated motion base supporting a seat holding the rider/operator can be controlled. The sensor array, hence, is used in the systems to provide input to control motion of a statically mounted motion base, e.g., the base is not moved to provide control input to a video game in the described system.

In some cases, the commanded motion for the motion base and attached seat may not be directly related to the sensor inputs. For example, a left turn input may result in the control system driving actuators to provide a right tilt of the motion base. Forward lean may result in a pitch down motion or increased speed. Further, manipulation of a physical device/component such as a joystick is not required as the rider's position and/or posture is directly sensed. The interactive system includes and uses a unique adaptable control algorithm for consistent control and operation given a wide variety of sensor inputs and input ranges. For example, a small-sized rider may move a small amount with low force against the sensors, yet the inputs may be treated similarly to a larger rider's larger movements and forces by the control system (whereas a joystick or steering wheel control typically requires the same amount of movement from each operator to achieve a like response). This is useful since the operators likely will vary significantly in body type and size.

As a form of review of the above description, it may be useful to remind the reader that the data handling algorithm (sensor input processor or processing module of the control module/program in FIG. 2) takes the raw data from each sensor and scales it based on a computed range for that particular sensor. The sensor-by-sensor range is determined by the difference between an average maximum value and an average minimum value for that sensor. This average is then updated every 0.2 seconds (or some other set update period) and maintained over a 48 second interval (or other selected and useful time interval).

Pseudo-code for this processing of raw data for use in motion control of a motion base supporting the vehicle and the vehicle seat with force sensors may be stated as: (1) get raw data from each sensor; (2) scale the raw input data from each sensor by the current calculated range for that sensor, with the range being the difference between the current calculated average maximum value and the current calculated average minimum value for that sensor; and (3) calculate an X-axis value as the normalized differential between the 3 left sensor (or other number of sensors) on the seat saddle or bench and the 3 right sensors on the seat saddle. Step 3 also involves calculating the Y-axis value as the normalized differential between the sensor(s) on the chest restraint and the sensor(s) on the back restraint. The axis values are then mapped to the range of input for both roll and lateral acceleration and pitch and heave on the motion base.

The pseudo-code for constructing and maintaining the average maximum and minimum values for each sensor over the time interval can be stated as: (1) maintain a queue of structures in memory/data storage that contains both an array of maximum values for all the sensors and an array of minimum values for all the sensors; (2) then, every 0.2 seconds (or other update time period), record the new minimum and maximum data for each sensor received within that time period; (3) push this newly recorded minimum/maximum data for each sensor onto the queue; (4) run a standard deviation filter on all minimum values for each sensor and all maximum values for each sensor in the queue, as this disregards values that are too far from the average of the set; (5) calculate the averages of each sensor's maximum and minimum values in the queue, and these averages are then used in the described pseudo-code to scale the raw sensor input (note, the average is weighted such that the lowest minimum values and highest maximum values account for the largest contribution to the average, and this ensures that no exceedingly high minimum or exceedingly low maximum skews the average); and (6) filter the current minimum and maximum average for each sensor as a weighted combination of the last two computed averages for that sensor, and this provides another layer of filtering to smooth the data.

We claim:

1. An interactive system for lean-based control of a ride or video game experience, comprising:
    a vehicle seat for physically supporting a passenger within the interactive system;
    a motion base with a vehicle base upon which the vehicle seat is mounted and with an actuator assembly selectively providing movement to the vehicle base and the vehicle seat;
    a control system generating and communicating control signals to operate the actuator assembly to initiate the movement of the vehicle base and the vehicle seat; and
    a plurality of force sensors positioned in the vehicle seat to sense forces applied by the passenger to the vehicle seat and, in response, to transmit sensor data signals to the control system, wherein the control system includes a sensor input processor processing the sensor data signals and wherein the control signals operating the actuator assembly are generated based on the processed sensor data,
    wherein the vehicle seat comprises a bench upon which the passenger sits, wherein the force sensors include an array of at least one left sensor and one right sensor positioned on the bench, and wherein the sensor input processor processing includes comparing a force applied to the at least one left sensor with the force applied to the at least one right sensor, whereby direction and magnitude of side-to-side leaning by the passenger in the vehicle seat provides user input controlling the actuator assembly such that directional movements and magnitudes of the directional movements in the movement of the vehicle base corresponds with the direction and the magnitude of the side-to-side leaning, and
    wherein the vehicle seat comprises a back restraint with an inner contact surface receiving a back portion of the passenger and a chest restraint with an inner contact surface receiving a front portion of the passenger, wherein the force sensors include a sensor on the inner contact surface of the back restraint and a sensor on the inner contact surface of the front restraint, and wherein the sensor input processor processing includes comparing a force applied to the front restraint sensor with a force applied to the back restraint, whereby direction and magnitude of front-to-back leaning by the passenger in the vehicle seat provides user input for use in controlling the actuator assembly.

2. The system of claim 1, wherein the sensor input processor processing includes determining an X-axis value using a differential provided by the comparing and wherein the control signals operating the actuator assembly are generated using the X-axis value to determine an amount of roll and lateral acceleration of the vehicle base.

3. The system of claim 1, wherein the sensor input processor processing includes determining a Y-axis value using a differential provided by the comparing and wherein the control signals operating the actuator assembly are generated using the Y-axis value to determine an amount of pitch and heave of the vehicle base.

4. The system of claim 1, wherein the control signals operating the actuator assembly are generated based on the processed sensor data with a commanded motion of the vehicle base being indirectly related to inputs by the passenger to the sensors.

5. The system of claim 1, further comprising a display system displaying images associated with the ride or video game experience and wherein the control system generates signals controlling the display system based on the processed sensor data.

6. A lean-based control method for a motion base supporting a vehicle seat for a passenger, comprising:
    when a passenger is seated in a vehicle seat, receiving force-related data from a plurality of sensors provided in the vehicle seat, wherein the sensors are provided in an array of left and right sensors on a saddle of the vehicle seat, wherein at least one of the sensors is provided in a front restraint, and wherein at least one of the sensors is provided in a back restraint;
    normalizing the force-related data; and
    based on the normalized force-related data, generating control signals to drive actuators of a motion base supporting the vehicle seat to move the motion base,
    wherein the receiving of the force-related data is performed periodically over a predefined time interval, wherein the normalizing includes determining a range of input values for each of the sensors comprising a difference between an average maximum value and an average minimum value for the sensor, and wherein the normalizing further includes scaling the received force-related data by the determined range for the sensor.

7. The method of claim 6, wherein the generating of the control signals comprises determining an X-axis value, using the normalized force-related data, as a differential between the left sensors and the rights sensors and determining a Y-axis value, using the normalized force-related data, as a differential between the at least one of the sensors in the front restraint and the at least one of the sensors in the back restraint.

8. The method of claim 7, wherein the generating of the control signals further comprises mapping the X and Y-axis values to a control range of inputs for the motion base.

9. The method of claim 6, wherein a maximum value and a minimum value are calculated for each of the sensors each time the receiving of the force-related data is performed and the calculated minimum and maximum values are used to determine the average minimum and maximum values for the sensors.

10. The method of claim 9, further comprising running a standard deviation filter on the calculated minimum and maximum values to discard outlier values for each of the sensors.

11. A control assembly for an interactive ride or video game, comprising:
    an array of sensors adapted for sensing applied forces, the array of sensors being positioned with a first set of the sensors on a right portion of a support surface of a seat and with a second set of the sensors on a left portion of a support surface of the seat;
    a sensor input processing module executable by a controller to receive and process data from the sensors to determine average minimum and maximum values for each of the sensors, to determine an expected range for each of the sensors based on the average minimum and maximum values, to scale the received data from the sensors using the expected ranges; and based on the scaled sensor data, a control module generating control signals for a driver assembly to provide defined movements of a motion base supporting the seat, wherein the array of sensors further includes a sensor in a front support of the seat and a sensor in a back support of the seat and wherein the sensor input processing module further calculates a Y-axis value as a differential between the scaled sensor data of the front support sensor and the back support sensor.

12. The control assembly of claim 11, wherein the defined movements of the motion base include at least roll and lateral acceleration.

13. The control assembly of claim 12, wherein the sensor input processing module further calculates an X-axis value as a differential between the scaled sensor data of the first set of sensors and scaled sensor data of the second set of sensors.

14. The control assembly of claim 13, wherein the control module controls roll by mapping the X-axis value to a roll input for the driver base.

15. The control assembly of claim 11, wherein the control module controls pitch and heave by mapping the Y-axis value to pitch input for the driver base.

16. The control assembly of claim 11, wherein the control module further generates display system control signals based on the scaled sensor data and on a state of a game or ride program.

* * * * *